Patented June 16, 1942

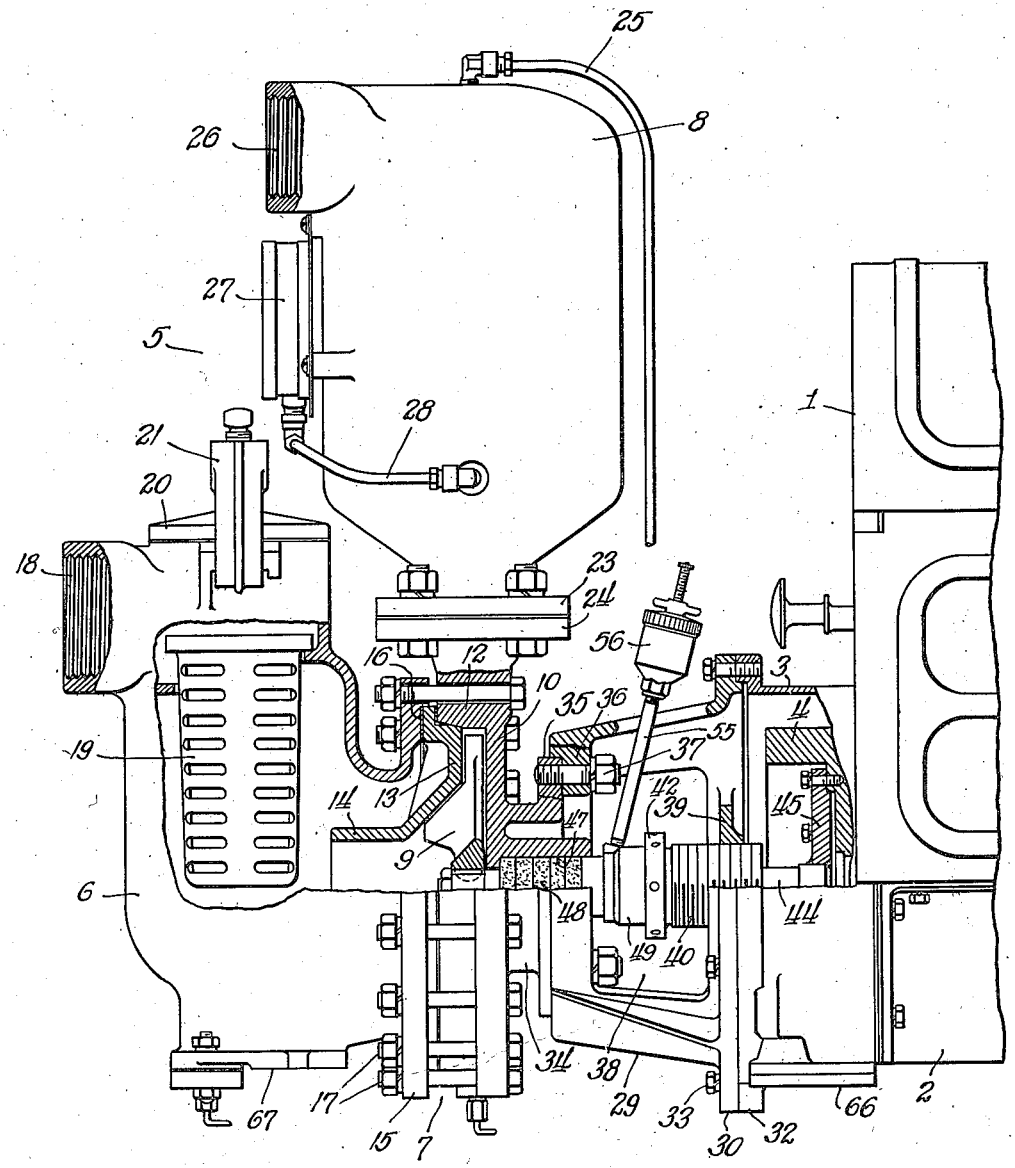

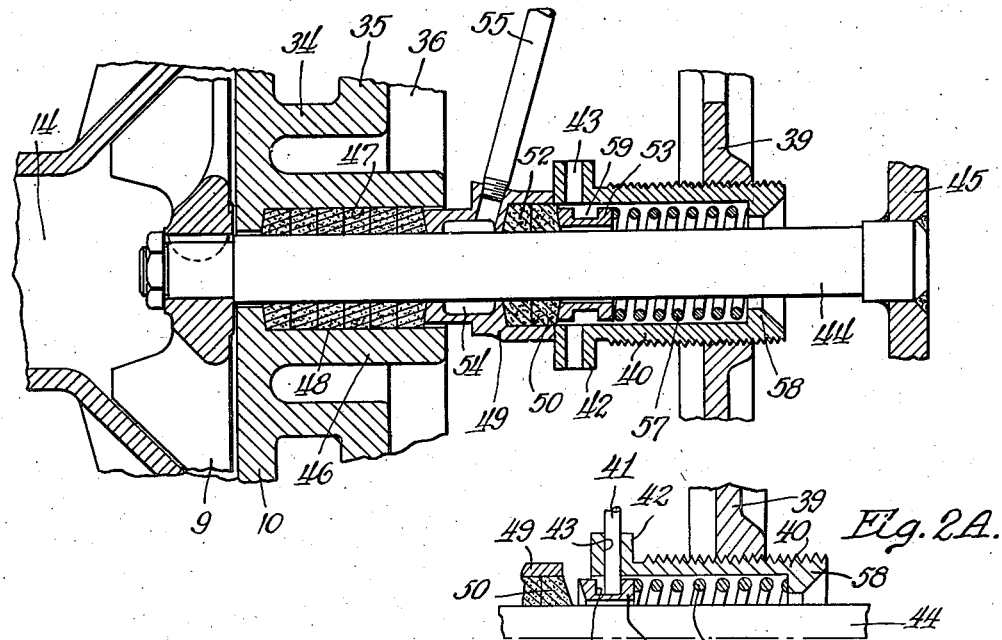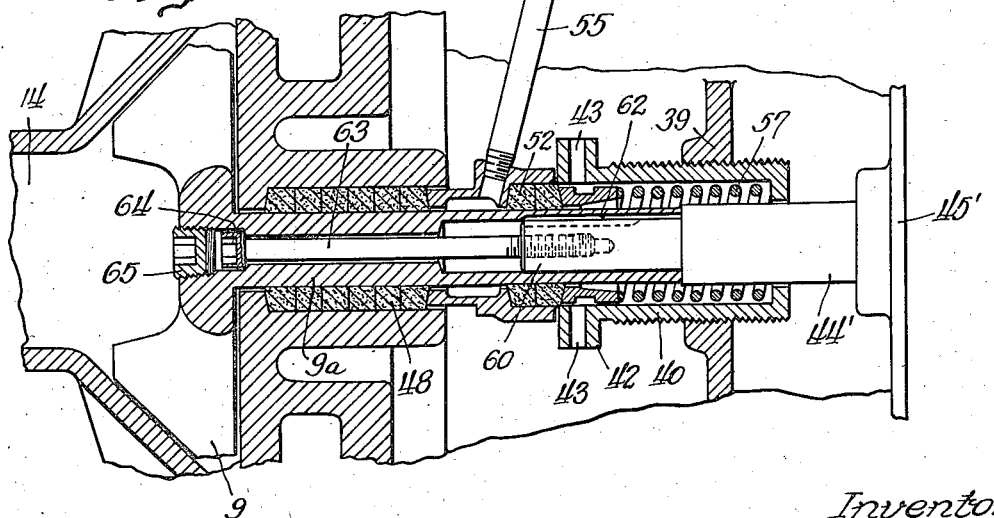

2,286,425

UNITED STATES PATENT OFFICE 2,286,425

PACKING MEANS FOR SHAFTS

Harry E. La Bour, Elkhart, Ind.

Original application September 2, 1939, Serial No. 293,227. Divided and this application March 29, 1941, Serial No. 385,883

9 Claims. (Cl. 286—28)

The present invention relates to packing means for shafts, and particularly for rotary pump shafts such as are employed in centrifugal pumps. The present application is divisional of my application, Ser. No. 293,227, filed September 2, 1939.

In the operation of centrifugal pumps, one of the ever present difficulties is to keep the shaft tight against the entrance or exit of air or working fluid, as the case may be. In the case of the centrifugal self-priming pump, tightness of the packing gland or shaft seal is of very great practical importance in that leakage of air inwardly, particularly during priming, is destructive of the vacuum which can be attained, and unless provision is made for an adequate shaft seal, the self-priming pump will not operate satisfactorily. While the present shaft seal has been designed particularly for meeting the problem of the self-priming centrifugal fire pump disclosed in my parent application, it has general utility, as will appear from the detailed description and statement of operation.

In shaft seals employing fibrous packing, it is desirable to maintain a continuous resilient pressure upon the fibrous packing to make it conform as nearly as may be possible to the shaft. One of the difficulties of the devices of the prior art is that when the gland follower is controlled solely through resilient pressure, as by the application of springs, the gland follower not infrequently tends to cock to one side and thereby distribute the spring pressure unevenly and produce an unsatisfactory seal. According to the present invention, spring pressure is applied by a single spring guided in such relation to the shaft that no appreciable cocking of the follower is likely to occur, and further provision is made whereby, in periodically compressing the spring, positive pressure may be applied to the gland follower with such rectilinear engagement as to square up the gland follower with the shaft so as to restore it to alignment.

The device of the present invention aims further to permit optionally at the will of the operator a positive pressure to be applied to the gland follower without raising the spring pressure beyond a certain predetermined value.

In centrifugal fire pumps, such as herein illustrated, the pump may be required to raise liquid from a lower level, that is, a negative head, in which event the packing is under suction; or the pump may be employed as a booster pump, water under pressure of the order of 50 to 60 pounds per square inch being derived from water mains, through fire hydrants or the like. It can be seen at once that a spring pressure adequate to keep the packing tight under conditions of suction within the pump might not be adequate to keep the packing from being blown out when the pump is subjected to internal pressure of the order above indicated. If, in accordance with the prior art, the spring pressure upon the gland follower should be increased to the point of being able to hold against the above recited internal pressure, this spring pressure would be excessive under normal conditions where the pump is subjected to suction. Excessive pressure on the packing is to be avoided because it tends to cause heat with resultant friction and wear, and, in the case of corrosive chemicals, to accelerate corrosion.

According to the concept of the present invention, a gland follower is engaged by a coil spring surrounding the shaft and compressed between the gland follower and a shoulder on a sleeve surrounding the shaft. The sleeve carries threads by which it may be positively advanced, first, to compress the spring and, further, to engage the gland follower. The spring, which is preferably pre-stressed to the desired degree, applies the desired normal pressure to the gland follower to keep the packing tight. The sleeve has an extending portion which may be brought into positive engagement with the gland follower, first, to apply positive pressure thereto for compressing the fibrous packing; second, it may serve to true up or rectify the position of the gland follower; and, third, it may act as a back stop preventing the fibrous packing and the follower from being blown outwardly by internal pressure. In the normal use of the device of my invention, the packing is tightened up by advancing the sleeve toward the gland follower, thereby first puting the spring under compression, and then engaging the follower positively to drive it against the packing. After the shaft has operated for a time, and the packing has worn, the spring with its persistent resilient pressure causes the follower to take up the wear in the packing and, by moving forwardly, to leave contact with the sleeve. If now the pump should be subjected to internal pressure, tending to drive the packing out of its recess, the follower can be driven back no farther than the distance of the small gap caused by takeup due to wear, and when this gap has been closed up between the follower and the head of the sleeve, the sleeve provides a firm unyielding back stop for the follower, which prevents any further displacement of the packing and follower. The gap between the sleeve and the follower, produced by takeup due to wear of the packing, may be closed up at any time by rotating the sleeve on its threads or other equivalent threaded means for advancing the sleeve and thereby bringing the sleeve into engagement with the follower.

The object of the present invention is to provide a simple, effective, and conveniently serviceable form of shaft seal for centrifugal pumps and the like generally, and for self-priming centrifugal pumps specifically.

A further object is to provide a shaft seal which is effective over a wide range of fluid pressures, positive and negative, without requiring abnormal spring pressure on the follower.

Now in order to acquaint those skilled in the art with the manner of constructing and operating my invention, I shall describe, in conjunction with the accompanying drawings forming a part of the specification, a specific embodiment of the manner of constructing and operating the same.

In the drawings:

Figure 1 is a side elevational view, partly in section, of a self-priming centrifugal pump with a gasoline engine driving motor directly connected and employing the seal of my invention;

Figure 2 is a vertical section, longitudinally of the shaft, showing the shaft seal of Figure 1;

Figure 2A is a fragmentary section of the spring barrel or sleeve with the auxiliary follower held by a pin to prevent expansion of the follower spring; and Figure 3 is a view similar to Figure 2, illustrating the use of a two-part shaft in this construction.

Referring to Figure 1, the driving motor 1 is preferably a small, high-speed, four-cylinder gasoline engine having the usual operating parts including a crank case 2 and a flywheel housing 3 in which there is disposed the engine fly wheel 4 mounted on the crank shaft (not shown), the crank shaft having suitable bearings in the engine frame, as is old in the art. The self-priming centrifugal pump 5 comprises an intake trap 6, an impeller housing 7, and a separator 8. The impeller 9 is disposed in the impeller housing between the back plate 10 of the main frame element 12 of the pump housing and a front plate member 13. The front plate member 13 has a short tubular intake connection 14 which communicates with the interior of trap 6. The trap 6 has a bolting flange 15 which engages the offset clamping flange 16 on the front plate 13. By means of bolts 17, 17 the flange 15 of the intake trap member 6 is clamped against the flange 16, the member 13 having a slightly tapered annular shoulder which is forced within the confines of the correspondingly tapered inner periphery of the bore of main frame member 12, and these parts being firmly held together on suitable pilots.

The intake trap 6 has a threaded inlet 18 for communication with a suitable suction pipe through appropriate connections. A removable strainer 19 is designed to catch coarse and fibrous material which might be drawn into the pump. The top of the trap 6 is closed by a cover plate 20 and a clamp 21 of known construction. The main frame 12 of the pump body has suitable main and auxiliary ports therein providing communication between the channel in which the impeller 9 runs and the interior of the separator 8, the separator having a flange 23 mating with the flange 24 on the pump body 12, whereby these parts are clamped together. The pump is of the hydraulic balance type disclosed in my Patent No. 1,578,236.

The separator at its upper end has an air vent connection leading to a small copper tube 25 permitting the escape of air while the fire pump is filling its suction with the discharge shut off, as is explained in connection with the parent case. This vent is preferably of the constantly open type. A discharge opening 26 in the top of the separator 8 is adapted to be connected to the fire hose or other discharge conduit through a shutoff valve. A pressure gauge 27 is connected to the interior of the separator as through the pipe 28 to indicate when the pump has filled its suction pipe and is ready to throw water out through the fire hose.

The pump 5 and motor 1 are connected together by a bell bracket 29 which has a flange 30 mating with the flange 32 on the flywheel housing 3, the two parts being piloted together and held by the cap screws 33. The main pump body 12 has a short neck 34 terminating in a flange 35 upon which is piloted the bell bracket 29 and to which the bell bracket is clamped by means of the inwardly extending flange or series of lugs 36 and studs 37. The sides of the bell bracket 29 are provided with openings or windows 38 through which the studs 37 may be drawn up and through which the packing shown in detail in Fig. 2 and in Fig. 3 may be serviced. The bell bracket 39 has at its right hand end, as shown in Figure 1, a central threaded plate or hub member 39 which cooperates with the threaded sleeve 40. Referring more particularly to Figure 2, it will be seen that the sleeve 40 is mounted on threads in the hub or plate 39 of the bell bracket, and this sleeve has a flange or head 42 with capstan sockets 43 which may receive a suitable pin or spanner wrench for rotating the sleeve on the threads.

Obviously, as an alternative mounting, the sleeve 40 may be mounted non-rotatively in the plate or hub 39 and provided with a nut for forcing the said sleeve towards the left when that is desired.

The back plate 10 of the pump body 12 has a central opening through which extends the impeller shaft 44. In the construction shown in Figures 1 and 2, the impeller shaft is welded at its right hand end to a plate 45 which in turn is bolted to the flywheel 4 of the engine. The impeller 9 is removably mounted as by means of a key and nut or other suitable construction upon the end of the shaft, whereby it may readily be removed without requiring removal of the shaft if the pump and motor are to be separated or if the impeller is to be replaced. A shaft 44 extends through the boss or hub 46 of the back plate 10, this hub having an annular recess or counterbore 47 in which there is disposed the fibrous packing 48 for making a tight joint between the shaft and the pump body. A gland follower 49 of known form having at its reduced end a slightly concave face engaging the fibrous packing 48 is entered into the counterbore so as to secure a guidance or piloting therein, and is adapted to be forced against said fibrous packing 48 to maintain the seal. The rear end of the follower is enlarged in diameter and contains an annular recess or counterbore in which is disposed an auxiliary packing 52 and this in turn is engaged by an auxiliary follower 53. The body of the main follower 49 contains a lubricant distributing recess 54 which is connected externally as by a small diameter pipe 55 to a compression grease cup 56 or the like. The auxiliary packing 52 and its follower are intended to maintain a tight seal at the rear of the lubricating chamber 54, so that when lubricant under pressure is forced into the chamber 54, it may be driven forward between the shaft and the packing 48. The auxiliary follower 53 is preferably piloted in the counterbore 50 but at all events is guided in the bore of the sleeve 40, so that it tends to be maintained in correct alignment with the axis of the shaft. A coiled compression spring 57 is disposed between the auxiliary follower 53 and the inwardly extending flange 58 on the rear of the said sleeve. This spring is disposed in the pocket thus formed under initial stress. In other words it is prestressed, and if released would expand beyond the end of the sleeve. The follower 49 has on its right hand end, as viewed in the drawings, a flat annular engaging face for engagement by the head 42 of the sleeve 40. The head 42 of the sleeve has a like flat annular engaging face, and these faces are at right angles to the axes of the shaft so that this engagement tends to true up the position of the follower with respect to the axis of the shaft. It will be observed that in Figures 1 and 2 the head of the sleeve 40 is shown in engagement with the rear of the follower 49. This is the position in which the parts are placed when the pump is first put into service, or whenever the sleeve 40 has been advanced on the threads to engage the said follower 49. When wear occurs in the packing 48, the volume thereof is reduced and the follower 54 under the influence of the spring 57 moves to the left and takes up the volumetric loss, the packing acting somewhat as a stiff fluid permitting deformation and displacement under the pressure of the spring 57.

Obviously, the auxiliary packing 52 and auxiliary follower 53 constitute a refinement which, while not absolutely necessary in some cases, is generally desirable. The spring thus exerts its pressure of recoil upon both packings 52 and 48 in series and keeps them both displaced into contact with the shaft 44.

When wear of a predetermined amount has occurred, it becomes necessary to repack the shaft. This is generally done by pulling out the old packing or part of the same and/or introducing new packing. The device of my invention is designed to facilitate this operation. It will be observed that the auxiliary follower 53 has an annular groove or recess 59 which may be brought into register with the inner ends of the radial capstan sockets 43. By inserting a pin 41 through one of the capstan openings 43 and extending the same into the groove 59, the spring may be held under compression, so that it cannot force the follower 53 out beyond the sleeve except in small degree, and thereupon the sleeve 40, the auxiliary follower 53 and the spring 50 may be moved as a unit to the right by turning on the threads, thus providing the necessary space for servicing either the packing 52 or the packing 48 or both of them.

Obviously, also if it is desired to apply the positive pressure of the threads first to the packing 52, this may be accomplished by pinning together the sleeve 40 and the follower 53 through the medium of a pin or pins 41 in one or more of the sockets 43 extending into the groove 59. In that position a slight forward projection of the follower 53 permits it to apply pressure to the said packing 52 in excess of that which the spring 57 alone could apply.

Assuming that the parts are in the position shown in Figure 2, and that some wear on the packing 48 has occurred and has been taken up by recoil of the spring 57, the follower 49 and the head 42 of the sleeve will be out of engagement, since the spring will have thrust the main follower 49 to the left to make up for the loss of volume of the packing 48. The follower 49 is free to slide back and forth, although it is prevented from turning by the pipe 55 which extends through a slot in the bell crank 29 as shown in Figure 1. Normally the pump in operation is under suction since it lifts liquid from the level below the pump. If, however, the pump should be connected with the intake connection 18 supplied with water under pressure as would be the case if the pump were connected to a fire hydrant, the packing 48 would be under the pressure prevailing in the impeller chamber. The usual water hydrant in city water supply systems carries a pressure of the order of 55 to 60 pounds, and it may be higher. The tendency is to force the packing 48 out of the recess 47, but this is prevented in the present construction by the follower 49 coming into engagement with the head of the sleeve 44 as soon as the gap, due to wear, is taken up. Thus the packing will be kept tight against a high internal pressure, as well as against internal suction without requiring a spring pressure greater than that which is sufficient to keep the packing tight under suction.

In Figure 3 I have illustrated the sleeve 40 and the follower 49 as separated by a small gap, such as would be occasioned by wear on the main packing 48. In this figure I have illustrated also the use of a unitary impeller 9 and impeller shaft 9a, such as would be desirable for handling corrosive liquids. The impeller shaft 9a is joined to the shaft 44a which is mounted either in suitable bearings in a stationary part of the installation or connected to an extension which is mounted in suitable bearings.

The impeller shaft 9a is counterbored to receive the stud portion 60 of the shaft 44'. The shaft 44' and its stud or reduced diameter portion 60 may be made of a metal which is not corrosion resistant. The corrosion resistant shaft 9a extends through both packings 48 and 52 being suitably counterbored to receive the stud 60, and the said telescopic parts being provided with a suitable key 62. A central bolt 63, the head of which is recessed in a counterbore formed at the left end of the shaft 9a, draws the two telescoping parts together, and the recess in which the head 64 of the bolt 63 is disposed is closed by a tapered plug 65 which provides a fluid-tight closure.

The operation of the form shown in Figure 3 is otherwise identical with that shown in Figures 1 and 2.

The unit as a whole is supported on a frame as by the pads 66 on the motor frame and 67 on the pump, so that the parts are adequately supported, and the two units are kept in alignment by the bell bracket 29. The form of this bracket may obviously be varied, and a different form of connection between the units may be provided. There is required for the present type of shaft seal a member such as the plug or plate 39 rigid with the frame of the pump, so that the sleeve 40 may have a positive support against which it may react both for supplying the spring pressure and for providing the positive pressure or back stop effect, as the case may be. Obviously, the shaft instead of being mounted as an extension of the crank shaft, may be supported in a suitable bearing independently of the drive of the motor, as will be apparent to those skilled in the art.

The head 42 is adapted for operation by a spanner wrench or a small rod inserted in the opening 43, but obviously this head may be shaped in any suitable manner for engagement by a wrench or other means for rotating the sleeve.

I do not intend to be limited to the specific details herein disclosed as they may be varied within the skill of the art without departure from the invention as defined in the appended claims.

I claim:

1. Packing means for a shaft comprising in combination an apertured pressure containing member, a shaft extending through the aperture, said member having an annular recess for packing surrounding said aperture, a supporting bracket rigid with said member, said bracket having a ring member surrounding said shaft and spaced from said member to provide room to service the packing, said ring carrying internal threads, packing in said recess, a gland follower engaging the packing, a coil spring on the shaft transmitting its recoil to the follower and a sleeve threaded in the ring and having an internal shoulder for engaging the rear end of the spring to compress the same, said sleeve having a shoulder head at its forward end by which the sleeve may be turned on the threads, said head forming a solid annular abutment for engaging the follower.

2. The combination of claim 1 wherein the follower has a lubricating recess with a lubricant supplying connection and the rear end of the follower contains an annular recess for packing, packing in said second recess, a secondary follower disposed between the adjacent end of the spring and said latter packing, and telescoping with the sleeve.

3. Packing means for a shaft comprising a gland follower adapted to embrace the shaft and to compress a suitable packing thereupon, said follower having an annular recess for receiving auxiliary packing, an auxiliary follower for engaging said auxiliary packing, a threaded sleeve adapted to embrace the shaft and to be advanced into engagement with the first follower, said sleeve having an annular space for receiving a compression spring, a spring in said space, the auxiliary follower being guided in said sleeve, said sleeve having a head by which the sleeve may be rotated on its threads, and means for holding the auxiliary follower in the sleeve to prevent expansion of the spring when the sleeve is moved endwise away from the follower.

4. The combination of a main gland follower adapted to embrace a shaft to be sealed, said gland follower having a lubricant recess and an annular recess for auxiliary packing, an auxiliary follower for engaging the packing in said recess, a threaded sleeve adapted to embrace the shaft and having a flange at its rear end, a spring confined by the said flange and said auxiliary follower, the sleeve having a head by which it may be turned upon the threads, said head having openings and the auxiliary follower having a shoulder by which the head of the sleeve and the auxiliary follower may be coupled together by the insertion of a pin through one of the openings.

5. For use in a direct driven motor pump unit wherein the pump has a back plate and the motor has a flywheel housing, the combination of a bell bracket having a front flange adapted to be bolted to the back plate and a rear flange adapted to be bolted to the flywheel housing, a hub in the rear of the bell bracket, the hub having an opening for the passage of a shaft, a cup-shaped sleeve seated in and supported by the hub and having screw threads upon which it may be advanced and retracted axially along the shaft said sleeve having a head disposed between the front flange and the rear flange of the bell bracket, a coil spring seated in the bottom of the sleeve, and a gland follower adapted to receive the thrust of the spring to take up packing wear, the follower and the head of the sleeve being adapted to be positively engaged independently of the spring.

6. In combination, a pump body having a shaft opening and a communicating packing recess, a rotatable shaft extending through said opening, packing in the recess, a follower having a portion of reduced diameter adapted to enter said recess to compress the packing up on the shaft and having an enlarged head portion, a bracket rigid with the pump body having a ring member axially in line with said shaft opening and surrounding said shaft, said ring being spaced from said pump body, a spring barrel surrounding the shaft and having an enlarged head at the end adjacent the follower and being threaded at its other end externally into the said ring, said head being adapted to engage the head portion of the follower to compress the packing, a coiled compression spring disposed in the spring barrel and engaging a shoulder in the barrel, the other end of the spring reacting against the follower to keep the packing compressed, said spring barrel being movable axially on said threads away from the recess far enough to permit the follower to move away from the recess to give access to the mouth of the recess for servicing said packing.

7. In a packing gland construction, a member having an opening counterbored to provide a packing recess, a shaft to be packed extending through said opening, packing in the recess, a follower on the shaft extending into said recess and engaging the packing, said follower having a packing recess at its outer end, secondary packing in said second recess, means comprising a duct opening into the interior of said follower for introducing a lubricant between said packings, an auxiliary follower on the shaft for entering the second recess and compressing said secondary packing, a bracket rigid with said member carrying a ring surrounding said shaft, said ring being internally threaded, a spring barrel externally threaded at its outer end to thread into said ring, a compression spring in said barrel, an internal shoulder in said barrel forming an abutment for said spring, said spring being compressed between said auxiliary follower and said abutment, said barrel having at its inner end a head adapted to be engaged by a tool for turning the barrel on its threads, said head being engageable with the first named follower to force it axially against said first named packing.

8. The combination of claim 7 wherein said barrel and auxiliary follower have means for restraining the expansion of the spring when the barrel is retracted from the main follower to permit servicing of the packing.

9. In combination, a pressure container having an apertured wall, with a counterbore forming a packing recess, a shaft extending through the aperture, packing in the recess about the shaft, a follower having a cylindrical front portion adapted to enter the recess and having an enlarged rear portion, a bracket rigid with said wall, said bracket having a ring, a threaded sleeve mounted in said ring, said sleeve being advanceable and retractible on said threads with respect to the ring, said ring being spaced from said recess far enough to permit the sleeve and the follower to be withdrawn away from the recess to give access to the recess, the enlarged rear portion of the follower having a counterbore forming an auxiliary packing recess, an auxiliary follower telescoping with the adjacent end of the sleeve and being adapted to enter the auxiliary recess to compress the auxiliary packing, a compression spring carried in said sleeve and engaging the auxiliary follower, said sleeve having a head at its front end for reaching over the auxiliary follower and positively engaging the enlarged rear portion of the first follower and aligning it with the axis of the shaft.

HARRY E. LA BOUR.